United States Patent
Cassini et al.

(10) Patent No.: US 9,942,517 B1
(45) Date of Patent: Apr. 10, 2018

(54) MULTI-MODE VIDEO CONFERENCING SYSTEM

(71) Applicant: Avaya Inc., Santa Clara, CA (US)

(72) Inventors: Angelo Li Quadri Cassini, Ancona (IT); Simone Angelelli, Santa Maria Nuova (IT); Andrea Pasquinelli, Chiaravalle (IT); Stefano Carnevali, Ancona (IT); Stefano Filippetti, Ancona (IT)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/285,205

(22) Filed: Oct. 4, 2016

(51) Int. Cl.
| H04N 7/14 | (2006.01) |
| H04N 7/15 | (2006.01) |
| H04N 5/232 | (2006.01) |
| H04S 1/00 | (2006.01) |

(52) U.S. Cl.
CPC ......... *H04N 7/152* (2013.01); *H04N 5/23296* (2013.01); *H04S 1/002* (2013.01)

(58) Field of Classification Search
CPC ..... H04N 5/23296; H04N 7/152; H04S 1/002
USPC ....................... 348/14.01–14.16; 379/201.01, 379/202.01–207.01; 709/201–207, 709/217–248
See application file for complete search history.

(56) References Cited

U.S. PATENT DOCUMENTS

| 5,959,667 | A | 9/1999 | Maeng |
| 7,415,047 | B1 | 8/2008 | Levent-Levi et al. |
| 7,461,126 | B2 | 12/2008 | Berkeland et al. |
| 7,492,731 | B2 | 2/2009 | Hagendorf |
| 7,520,684 | B2 * | 4/2009 | Ingalls ............. G08B 13/19623 348/373 |
| 7,631,039 | B2 | 12/2009 | Eisenberg |
| 7,979,528 | B2 | 7/2011 | Eisenberg et al. |
| 8,145,770 | B2 | 3/2012 | Hagendorf |
| 8,208,004 | B2 | 6/2012 | Hagendorf et al. |
| 8,208,410 | B1 | 6/2012 | Hagendorf |
| 8,212,856 | B2 | 7/2012 | Modai et al. |
| 8,319,820 | B2 | 11/2012 | Wiener et al. |
| 8,464,053 | B2 | 6/2013 | Davis et al. |
| 8,483,044 | B2 | 7/2013 | BenZedeff et al. |
| 8,612,819 | B2 | 12/2013 | BenZedeff et al. |
| 8,982,177 | B2 | 3/2015 | Modai et al. |
| 2006/0013416 | A1 * | 1/2006 | Truong ................. H04M 3/568 381/119 |

(Continued)

OTHER PUBLICATIONS

U.S. Appl. No. 15/285,152, filed Oct. 4, 2016, Cassini et al.

(Continued)

*Primary Examiner* — Hemant Patel
(74) *Attorney, Agent, or Firm* — Sheridan Ross P.C.

(57) ABSTRACT

The present disclosure is directed to a video-enabled communication system that comprises a control unit, coupled with a camera, the camera acquiring an image of a local participant to provide to a remote participant during a video communication session. A microprocessor in the control unit executes an audio controller that causes the microprocessor to control, based on audio information collected by the control unit, movement and/or pan and/or tilt of a camera at a remote endpoint of the remote participant to capture a selected image of the remote participant for display to the local participant. The control unit can operate in multiple operating modes depending on the context of the video conference.

19 Claims, 12 Drawing Sheets

(56) References Cited

U.S. PATENT DOCUMENTS

| | | |
|---|---|---|
| 2007/0070177 A1 | 3/2007 | Christensen |
| 2009/0051754 A1 | 2/2009 | Levent-Levi et al. |
| 2009/0051756 A1 | 2/2009 | Trachtenberg et al. |
| 2009/0167842 A1 | 7/2009 | Sandhu |
| 2010/0008661 A1 | 1/2010 | Wood |
| 2010/0066807 A1 | 3/2010 | Eisenberg |
| 2011/0153735 A1 | 6/2011 | Eisenberg |
| 2011/0254914 A1* | 10/2011 | Ng .................. H04N 21/42202 348/14.16 |
| 2012/0081504 A1* | 4/2012 | Ng .......................... H04N 7/15 348/14.08 |
| 2012/0300080 A1 | 11/2012 | Batson |
| 2013/0166742 A1 | 6/2013 | Wiener et al. |
| 2014/0160225 A1 | 6/2014 | Baldelli et al. |
| 2015/0067817 A1 | 3/2015 | Modai |

OTHER PUBLICATIONS

Official Action for U.S. Appl. No. 15/285,152, dated Jan. 26, 2017 11 pages.
Official Action for U.S. Appl. No. 15/285,152, dated Jun. 20, 2017 12 pages.
Official Action for U.S. Appl. No. 15/285,152, dated Oct. 3, 2017 19 pages.

* cited by examiner

MULTI-MODE VIDEO CONFERENCING SYSTEM

FIELD

The disclosure relates generally to video communication and particularly to image capture device control in video telecommunication.

BACKGROUND

Video conferencing solutions use Pan Tilt Zoom (PTZ) cameras placed at the center of the display screen's upper or lower surface to capture video of participants. The PTZ camera is fixed firmly in the selected position and uses pan and tilt around a fixed or stationary axis in response to speaker tracking using microphone array technology.

Two-camera solutions, such as Polycom EagleEye™ and Cisco SpeakerTrack™, use microphone array technology for speaker tracking and switch the cameras between active speakers.

These solutions can provide remote participants with an undesirable video of the meeting, including blind spots, hidden participants, misleading gaze direction, among other issues, and a "one-size-fits-all" default operating mode that fails to account for different video conferencing settings.

SUMMARY

These and other needs are addressed by the various embodiments and configurations of the present disclosure.

A video-enabled communication system can include:
a microprocessor, coupled with the camera, to receive an image of an object of interest during a video communication session; and
a computer readable medium comprising instructions that program the microprocessor: (a) in a first operating mode, use a first set of instructions to perform a first video communication operation or function and (b) in a second operating mode, use a different set of instructions to perform the first video communication operation or function.

The first video communication operation or function can be one or more of collect local video or audio information during the video communication session, process the collected local video or audio information for output to a remote endpoint, or display remote video or audio information received from the remote endpoint.

In the first operating mode, the camera at a first location can be controlled by the microprocessor and, in the second operating mode, the camera at the first location can be controlled at least partially by a different microprocessor at a remote endpoint.

The microprocessor, in the first operating mode, can cause a set of speakers at a first location to provide stereophonic sound playback of audio information captured during the video communication session by a remote endpoint and, in the second operating mode, can cause the set of speakers at the first location to provide monophonic sound playback of the audio information captured during the video communication session by the remote endpoint.

The microprocessor can provide a display to a participant at a first location. In the first operating mode, the display has a first layout, the first layout comprising one or more images captured, during the video communication session, by a camera at a remote endpoint and, in the second operating mode, the display has a second layout, the second layout comprising one or more images captured, during the video communication session, by the camera at the remote endpoint. The first and second layouts differ by having different numbers or different types of displayed images.

The microprocessor can select the first or second operating modes based on a sensed context of the video communication session.

The sensed context can be defined by one or more of a number of session participants at each endpoint location, a number of endpoint locations participating in the session, a purpose of the session, and video conferencing preferences of one or more of participants to the session.

A video-enabled communication system can include:
a control unit, coupled with a camera, the camera acquiring an image of a local participant to provide to a remote participant during a video communication session.

The control unit in turn comprises:
a microprocessor; and
a computer readable medium comprising an audio controller that causes the microprocessor to control, based on audio information collected by the control unit, movement and/or pan and/or tilt of a camera at a remote endpoint of the remote participant to capture a selected image of the remote participant for display to the local participant.

The camera can be a pan, tilt, and zoom camera.

The microprocessor's control of the movement and/or pan and/or tilt of the camera at the remote location can be based on sound localization by the microprocessor at a location comprising the local participant.

An imaging controller can cause the microprocessor to move the camera from a first spatial location to a second spatial location relative to a selected point of reference to enable the camera to capture different images of the local participant for display, by a remote display device, to a remote participant to the video communication session.

The system can include an audio capturing device to capture speech of the local participant. The audio controller provides the captured speech to first and second sound speakers at the remote location for stereophonic playback of the speech by the first and second sound speakers, to the remote participant, the stereophonic playback being based on the sensed location of the local participant relative to the selected point of reference.

As a result of the movement, the pan rotational axis can move from the first spatial location to the second spatial location.

The camera movement can move the camera linearly or curvilinearly from the first to the second spatial locations, such as by a guide track assembly comprising at least one track along which the camera moves via a carriage movably engaging the at least one track.

The guide track assembly can comprise a carriage displacement unit to cause camera movement along the at least one track, a displacement measuring system to determine a position and/or displacement of the camera, relative to the selected point of reference, along the at least one track.

The microprocessor can determine the second spatial location of the camera based on a sensed location of the local participant.

The guide track assembly can further comprise a support arm engaging a local display device and a housing, engaging the support arm, and enclosing, at least partially, the at least one track, carriage, and camera. The housing can have a substantially transparent front surface to enable the camera to capture images of the local participant.

The microprocessor's control of the movement and/or pan and/or tilt of the camera at the remote location is generally based on sound localization by the microprocessor at a location comprising the local participant.

The present disclosure can provide a number of advantages depending on the particular configuration. The system and method of this disclosure can provide different operating modes to match the requirements of different types or settings of video conferencing sessions, such as ordinary business conferences, tele-teaching, and tele-interviewing. It can provide remote participants with a desirable video of the meeting, which removes blind spots, hidden participants, and misleading gaze direction. It can increase the eye contact of meeting participants at different nodes of the communication session. The side movement of the image capturing device, added to the appropriate pan of the lens barrel, can eliminate any blind area around the meeting table, thereby providing to the videoconference users all-round viewing of the speaker participants and other objects of interest, such as whiteboards and projector screens, in the room. It can mimic the participant's experience in moving his body from side-to-side to view meeting participants located in a common meeting room as opposed to different meeting room locations. When image capturing device lateral movement is combined with pan adjustment, stereophonic sound local site recording and remote site playback, and a curved display device, it can duplicate the feeling of all participants being seated around a common conference table as opposed to different conference tables in different locations. This can be further enhanced by a common endpoint controlling, by audio tracking in proximity to the common endpoint, the image capturing device location and orientation in the different locations.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "multipoint" conferencing unit refers to a device commonly used to bridge videoconferencing connections. The multipoint control unit can be an endpoint on a network that provides the capability for three or more endpoints and/or gateways to participate in a multipoint conference. The MCU includes a mandatory multipoint controller (MC) and optional multipoint processors (MPs).

The term "stereophonic sound" or "stereo" refers to a method of sound reproduction that creates an illusion of multi-directional audible perspective. This is usually achieved by using two or more independent audio channels through a configuration of two or more sound speakers in such a way as to create the impression of sound heard from various directions, as in natural hearing. The term "stereophonic" applies to "quadraphonic" and "surround-sound" systems as well as the more common two-channel, two-sound speaker systems. It is often contrasted with monophonic, or "mono" sound, where audio is heard as coming from one position, often centered in the sound field (analogous to a visual field).

The term "video" refers to any relevant digital visual sensory data or information, including utilizing captured still scenes, moving scenes, animated scenes etc., from multimedia, streaming media, interactive or still images etc.

The term "videoconferencing" refers to conduct of a videoconference (also known as a video conference or videoteleconference) by a set of telecommunication technologies which allow two or more locations to communicate by simultaneous two-way video and audio transmissions. It has also been called 'visual collaboration' and is a type of groupware. Videoconferencing differs from videophone calls in that it's designed to serve a conference or multiple locations rather than individuals.

The preceding is a simplified summary to provide an understanding

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

The Teleconferencing System

Figure 1:
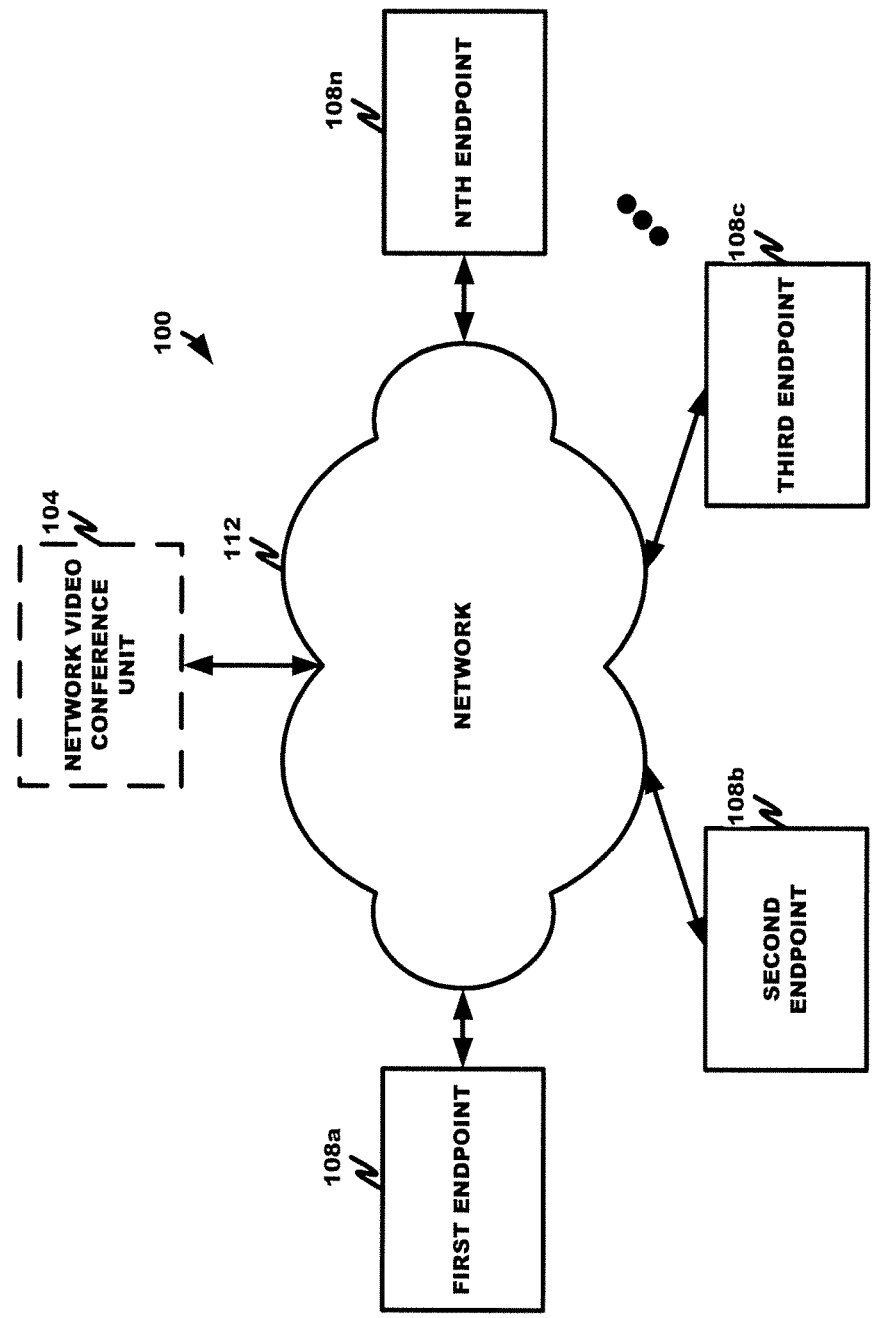
FIG. 1 is a block diagram depicting a system configuration according to an embodiment of the disclosure.

The conferencing system 100 of FIG. 1 generally includes an optional network video conference unit 104 and first, second, third, . . . nth endpoints 108a-n, interconnected by a network 112. While the first and second endpoints 108a,b are depicted, it is to be appreciated that more endpoints can be present and participating in the video conference. The conferencing system 100 can be a personal video conferencing system between two users communicating one-on-one or point-to-point, a group video conferencing system among three or more people, a mobile video conferencing system involving one or more mobile endpoints and can be a software only solution, hardware only solution, or combination of software and hardware solutions.

The optional network video conference unit 104 can be any network multipoint conferencing unit ("MCU") or video conferencing server ("VCS"). During a multipoint conference session, the MCU can manage multiple endpoints at once, coordinate the video data processing of the multiple endpoints, and forward the flow of media streams among the multiple endpoints. The MCU can conduct group video conferences under the principle of mixing media streams, i.e. mixing and re-encoding participants' video conferencing streams in real time. For example, the MCU can create a picture-in-picture effect. The MCU in most applications includes a multipoint controller ("MC") and optionally one or more multipoint processors ("MPs"). The MCs can coordinate media stream processing parameters between endpoints and typically support the H.245 protocol. The MPs can process, mix and switch multimedia streams.

In contrast, a VCS often implements a multiplexing pattern of the data streams, which implies no transcoding. The VCS typically redirects the media streams of the video conference participants. The compression/decompression and media stream mixing functions are generally performed in the endpoint devices.

The network video conference unit 104 can service any conference topology, including a centralized conference, decentralized conference, or hybrid conference topology. Exemplary video conference units that can be modified as set forth herein include the ELITE 6000™, 6110™, 6120™, S000™, 5105™, and 5110™ products of Avaya, Inc.

The first, second, third, . . . nth endpoints 108a-n can be any suitable devices for providing a user interface for a voice or video conference. Some of the endpoints can be capable of hosting the voice portion of the conference only or a part of the video conference (e.g., only display images of remote participants but not transmit an image of a local participant or only transmit an image of a local participant but not display images of remote participants) or all of the video conference (e.g., display images of remote participants and transmit an image of the local participant). The first and second endpoints at least capture and optionally display locally to the local participant images of local participants. Examples of suitable devices include a cellular phone, tablet computer, phablet, laptop, personal computer, and purpose-built devices, such as the SCOPIA XT EXECUTIVE240™, XT ENDPOINT™, XT1700 EP™, XT4200™, XT4300™, XT5000™, XT embedded Server™, and XT Endpoint™ with embedded server products by Avaya, Inc. that can be modified as set forth herein.

The optional network video conference unit 104 and first, second, third, . . . nth endpoints 108a-n are connected by the network 112. The network 112 can be a local area network ("LAN"), a wide area network ("WAN"), a wireless network, a cable network, a telephone network, the Internet, and/or various other suitable networks in which a video conferencing system can be implemented.

Figure 2:
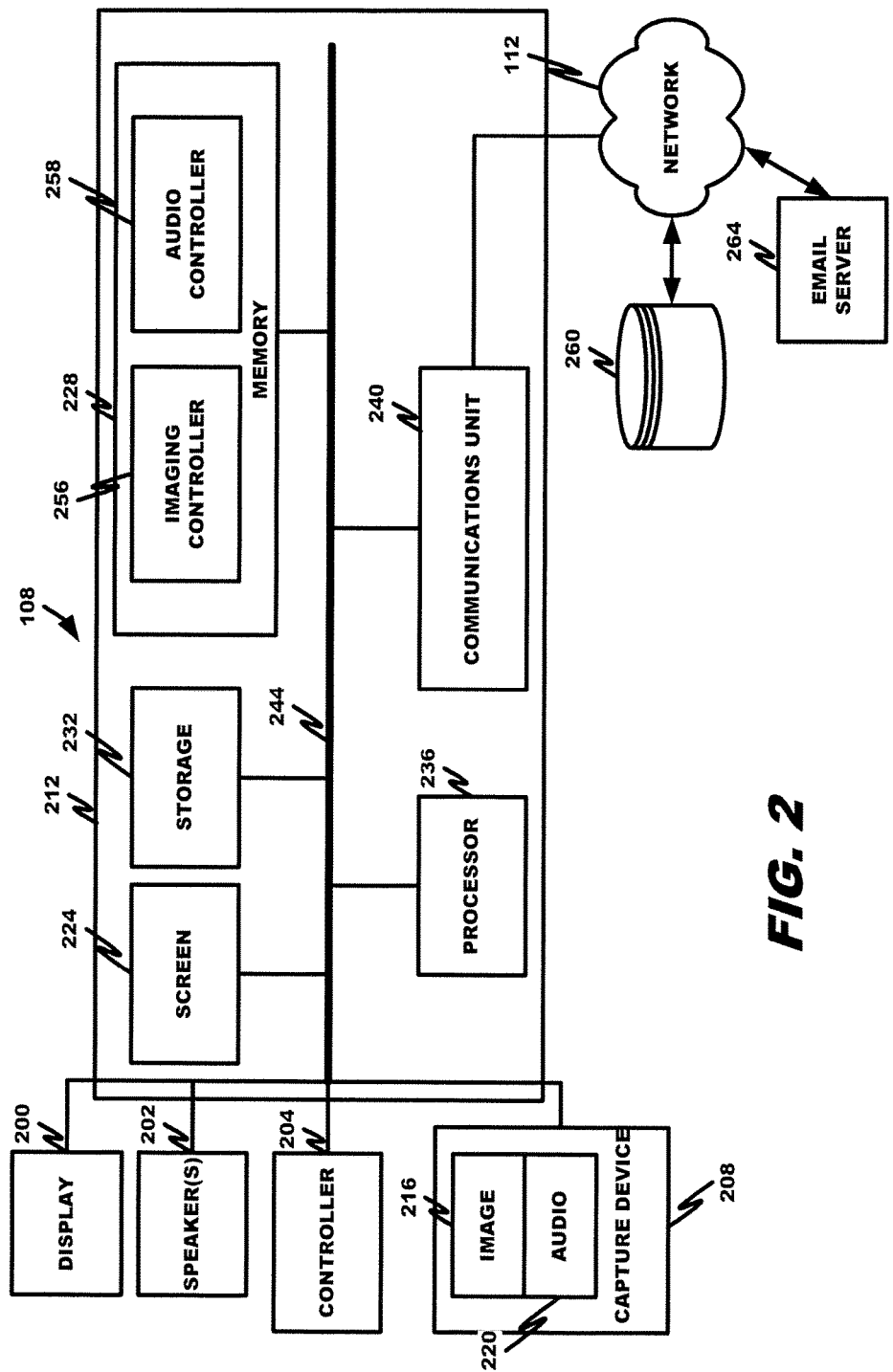
FIG. 2 is a block diagram depicting an endpoint configuration according to an embodiment of the disclosure.

With reference to FIG. 2, an exemplary endpoint is depicted. The exemplary endpoint 108 comprises a display device 200, one or more sound speaker(s) 202, a controller 204, a capture device 208, and a control unit 212.

The display device 200 can be any appropriate display or screen suitable to display an image stream received from the control unit 212. The display device 200 can be flat or curved depending on the application. The display device 200 may display an image stream received at the control unit 212 from one of the remote video conferencing endpoints over the communications network 112. Alternatively and/or additionally, the image stream received from the image capture device 208 may be displayed by the display device 200 and/or processed by the control unit 212 before transmission to the display device 200.

The controller 204 can be any type of input devices, such as a keyboard, a pointing device (e.g. mouse, trackball, pointing stick, etc.), a remote control unit or a touchscreen device enabling a participant of the video conferencing room to interact with the control unit 212.

The capture device 208 can include an image capturing device 216, such as one or more still or video cameras capable of capturing 2-dimensional or 3-dimensional image information, and an audio capturing device 220, such as one or more microphones.

The image capturing device 216 captures and provides image streams to the control unit 212. The image capturing device 216 typically comprises one or more mechanical or digital Pan-Tilt-Zoom (PTZ) cameras. The image capturing device 216 typically has a horizontal field of view of the lens in the range of from about 50 to about 80 degrees. However, those skilled in the art will appreciate that other types of cameras may also be used. The image capturing device 216 is able to move automatically to a variety of different spatial positions having differing distances relative to one or more participants. The positions are not simply different pan and tilt positions relative to a fixed rotational axis but different pan and tilt positions relative to differently located rotational axes.

The audio capturing device 220 can comprise an array of microphones to capture and provide the audio streams to the control unit 212. The audio capturing device 220 can capture stereophonically audio in the local monitored session location, which can be used for active speaker tracking (through speaker localization) to identify and locate a current active speaker. For example, the image capturing device can capture a video image of a selected area, and a processor can correlate the captured video image of the area and extract the digital data as an AC-3 bitstream. The data can be decoded into a multi-channel (e.g., 5.1 channel) audio source. Commonly, the AC-3 bitstream is interleaved with the video and control bitstreams.

The control unit 212 generally comprises a display screen 224, a memory 228, a storage unit 232, a processor 236 and a communications unit 240. The control unit 212 can communicate (i.e. exchange audio and video information and/or any additional data), over the communications network 112, with the other video conferencing endpoints and the network video conference unit 104, access an enterprise database 260 comprising subscriber information, or interact with an enterprise email server 264 comprising subscriber email correspondence.

The memory 228 can be any computer readable medium, such as a random access memory (RAM) or other dynamic storage device (e.g. dynamic RAM, static RAM, synchronous RAM, etc.) coupled to the bus 244 for storing information and instructions to be executed by the processor 236. Additionally, the memory 228 may be used to store temporary variables and/or other intermediate information during the execution of instructions by processor 236. It will be appreciated by those skilled in the art that the memory 228 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 236.

The storage unit 232 can be a further computer readable medium, such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other information and/or instructions.

The processor 236 can process any command received from a video conferencing user, triggered by the video conferencing endpoint 108 or received from the communications network 112 (e.g. from the network video conference unit 104 and/or from another video conferencing endpoint 108). In response to a received command, the processor 236 can retrieve and execute the relevant set(s) of instructions from one of the memories 228 and 232. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. Those skilled in the art will appreciate that the present disclosure is not limited to this single processor arrangement but that one or more processors in a multi-processor arrangement may be employed to execute the set(s) of instructions retrieved from one of the memories.

Finally, the communications unit 240 is generally a communication interface providing a two-way communication coupling between the video conferencing endpoint 108 and the communications network 112. The communications unit 240 can receive any type of data information from the different devices of the video conferencing endpoint 108 such as the display device 200, the controller 204, and the capture device 208 and pass the data information to the processor 236 for further processing and/or to other video conferencing endpoints of the video conferencing system 100 over the communications network 112. Also, the communications unit 240 can receive any additional data information received by a further device present in the video conferencing endpoint 108. The communication unit 139 can exchange (e.g. transmit and receive) any suitable type of data information with a plurality of devices coupled to the control unit 212 and exchange information with remote video conferencing endpoints 108 or the network video conference unit 104 of the video conferencing system 100 over the communications network 112.

Included in the memory 228 of the control unit 212 is an imaging controller 256 and an audio controller 258.

The Imaging Controller

The imaging controller 256 analyzes the meeting parameters, content, and activity to determine an initial and in-progress current object of interest in the meeting and a spatial location of each current object of interest relative to the capture device, to one or more other participants, and/or to another point or location of reference. The imaging controller 256 can determine the current object of interest and spatial location by one or more techniques including acquiring the facial images of each participant in the captured image using face detection techniques, motion detection, an active speaker tracking using speaker localization and a microphone array, gaze detection of one or more participants, and the like. The imaging controller 256, using face detection techniques, microphone array analysis, or motion detection, can detect a participant entering or leaving the monitored communication session area, e.g., room.

The imaging controller 256 can determine the object of interest and desired camera view to capture the object of interest. The imaging controller 256, for instance, is able to identify and adjust the capture device (e.g., adjust the pan, tilt or zoom of a camera) and/or a spatial position of the capture device 208 and/or image capturing device 216 to a selected view of the object of interest. By way of illustration, the desired view of the object of interest could include having all participants in frame, in focus and centralized in the captured image, and having substantially the least background image information in frame. Other object of interest views include focus on a selected meeting participant (e.g., meeting manager, presenter, speaker, etc.) with the selected meeting participant being in focus and centralized in the captured image. Other object of interest views will be appreciated by one of ordinary skill in the art. Once the target view is identified, the imaging controller 256 adjusts the captured image (e.g., moves the pan, tilt, and zoom of the camera) and/or a spatial position of the capture device 208 and/or image capturing device 216 to produce this view.

The Audio Controller

The audio controller 258 can provide stereophonic audio capture by the audio capturing device 208 in the first meeting location and playback by the sound speakers 202 in the second meeting location as left and right audio sourcing. Simultaneously, audio tracking can move the image capturing device to focus on the currently active speaker in the first meeting location for display of the captured image in the second meeting location. The total effect can be an immersive video conference feeling, where the participant speaker and the remote participants maintain constant eye contact. The audio captured by the audio capturing device 220 in the local monitored session area can be used by the local endpoint for active speaker tracking and by the remote endpoint in the remote monitored session area(s) to reproduce the sound sensed by the local endpoint using two or more independent audio channels in the remote endpoint. The local audio capturing device 220 can record the sound by one of many techniques for stereophonic sound reproduction, including without limitation the A-B technique (or time-of-arrival stereophony), X-Y technique (or intensity stereophony), M/S technique (or mid/side stereophony), near coincident technique (or mixed stereophony), pseudo-stereo, binaural recording, and other recording techniques as will be appreciated by one of ordinary skill in the art.

In one configuration, the local audio controller 258 can control the locally captured image displayed by the remote display device 200 and locally recorded sound playback by the remote sound speakers 202. The local audio controller 258, by local audio tracking, can have information about local active speaker location relative to the current position of the local image capturing device 216, or point of reference of the remote participants. The local audio controller 258 can control the display by the remote display device 200 of the locally captured image and locally recorded sound playback by the remote sound speakers 202 as stereophonic sound to emulate what the remote participants would experience if all of the local and remote participants were located in a common room during the session. The local active speaker tracking is used to control the locally captured image displayed by the remote display device 200 and locally recorded sound playback by the remote sound speakers 202.

In one configuration, the local audio controller 258 can control the pan and/or tilt and/or spatial position in the remote room of the remote image capturing device 216 to provide better eye contact between local and remote participant active speakers. The local audio controller 258, by local audio tracking, can have information about local active speaker location relative to the current position of the local image capturing device 216, or point of reference of the remote participants. The local audio controller 258 can control the pan and/or tilt and/or spatial position in the remote room of the remote image capturing device 216 so as to align, by the local and remote display devices 200, an image of the active speaker participant in the local room with a selected active speaker or non-speaker participant in the remote room. Simultaneous display by the local display device 200, of a frontal face view of the remote participant and, by the remote display device 200, of a frontal face view of the local active speaker participant aligns and provides face-to-face viewing by the two participants. This can be particularly advantageous where the movement of the local image capturing device 216 is controlled by local active speaker tracking using sound localization. Stated differently, the local active speaker tracking is used to control the pan and/or tilt and/or a spatial position of the remote image capturing device 216 and/or locally recorded sound playback by the remote sound speakers 202.

Figure 10:
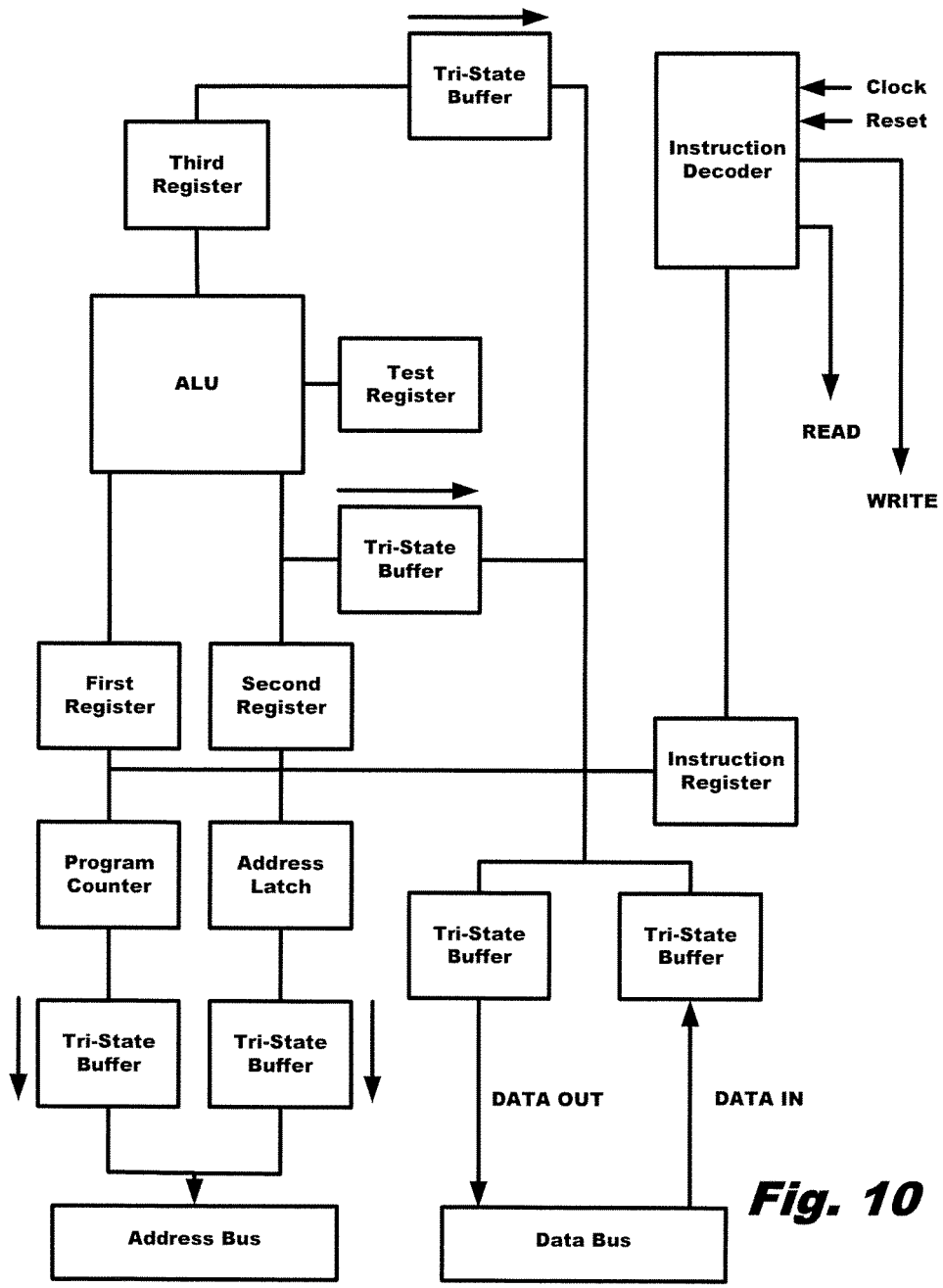
FIG. 10 is a block diagram of hardware for the control unit according to an embodiment.

With reference to FIG. 10, the control unit 212 can execute the image and audio controller using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The control unit 212 further includes first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines, in the verification system, from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. The ALU executes instructions for image capturing device(s) and audio capturing device(s) and display and playback of collected image and audio information.

Video Conferencing Session Examples

Figure 3:
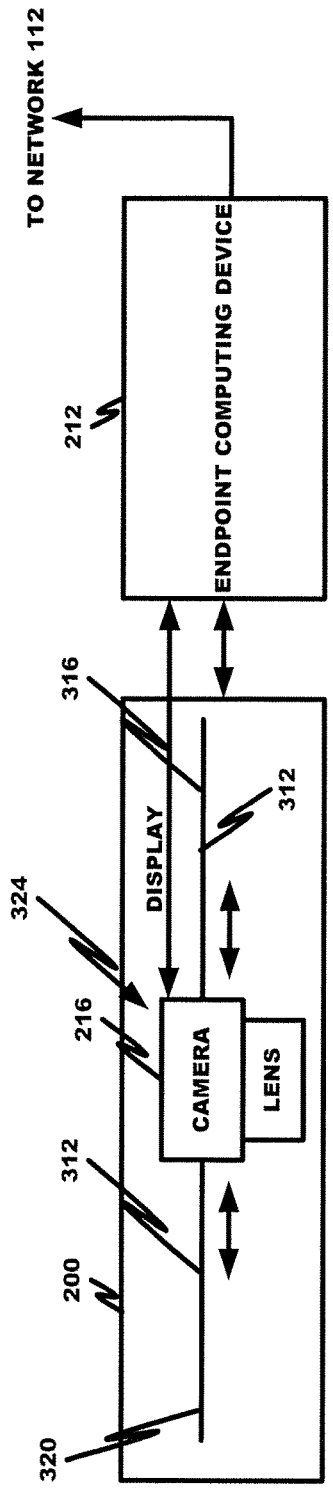
FIG. 3 is a block diagram an exemplary endpoint configuration during a video conferencing session.
Figure 3:
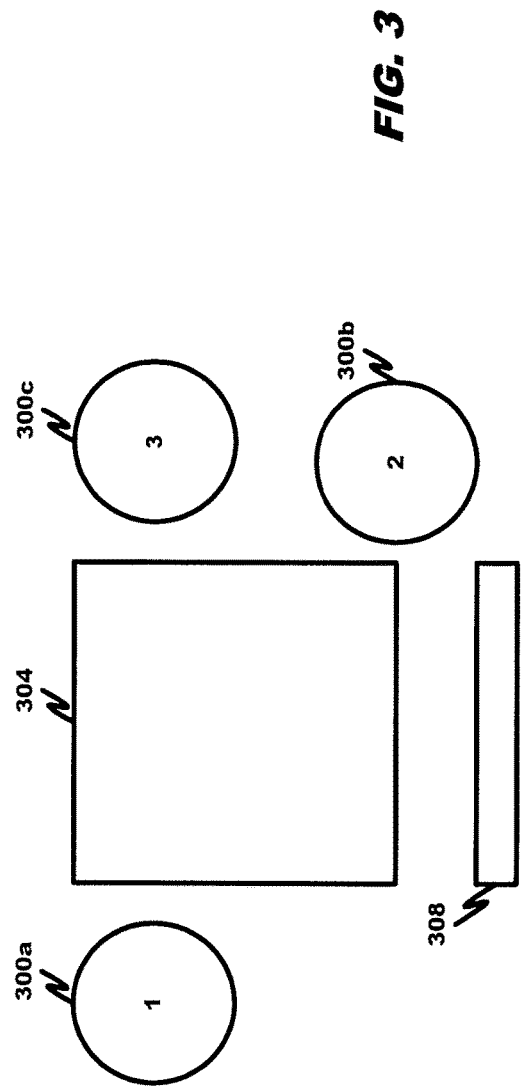

An example of a video conferencing communication session will be discussed with reference to FIG. 3. The meeting room includes first, second, and third participants 300a, b, c, a conference table 304, and whiteboard 308. The image capturing device 216 (shown as a camera) moves laterally back and forth along a defined continuous track 312 on the upper surface of the display device 200. At a first time, the image capturing device 216 is located at a first position 324 to capture, in focus, the first, second, and third participants 300a-c and whiteboard 308 and conference table 304 in a first view. The optical axis of the image capturing device is roughly centered on the centers of the table and whiteboard with all participants in view. At a second later time, the imaging controller 256 determines a change of the current object of interest to the first participant 300a (such as by detecting that the first participant is the active speaker), and moves the image capturing device 216 to a second position 316, with suitable adjustments to the pan, tilt and zoom to capture the desired view of the first participant. The desired view of the first participant has the first participant in focus and roughly aligned with the optical axis of the image capturing device 216. At a third later time, the imaging controller 256 determines a further change of the current object of interest from the first participant 300a to the third participant 300c (such as by detecting that the first participant is the active speaker) and moves the image capturing device 216 to a third position 320, with suitable adjustments to the pan, tilt and zoom to capture the desired view of the third participant. The desired view of the third participant has the third participant in focus and roughly aligned with the optical axis of the image capturing device 216. While a linear guide track 320 is depicted, it is to be appreciated that other guide track configurations can be employed, including curvilinear and arcuate.

Figure 4:
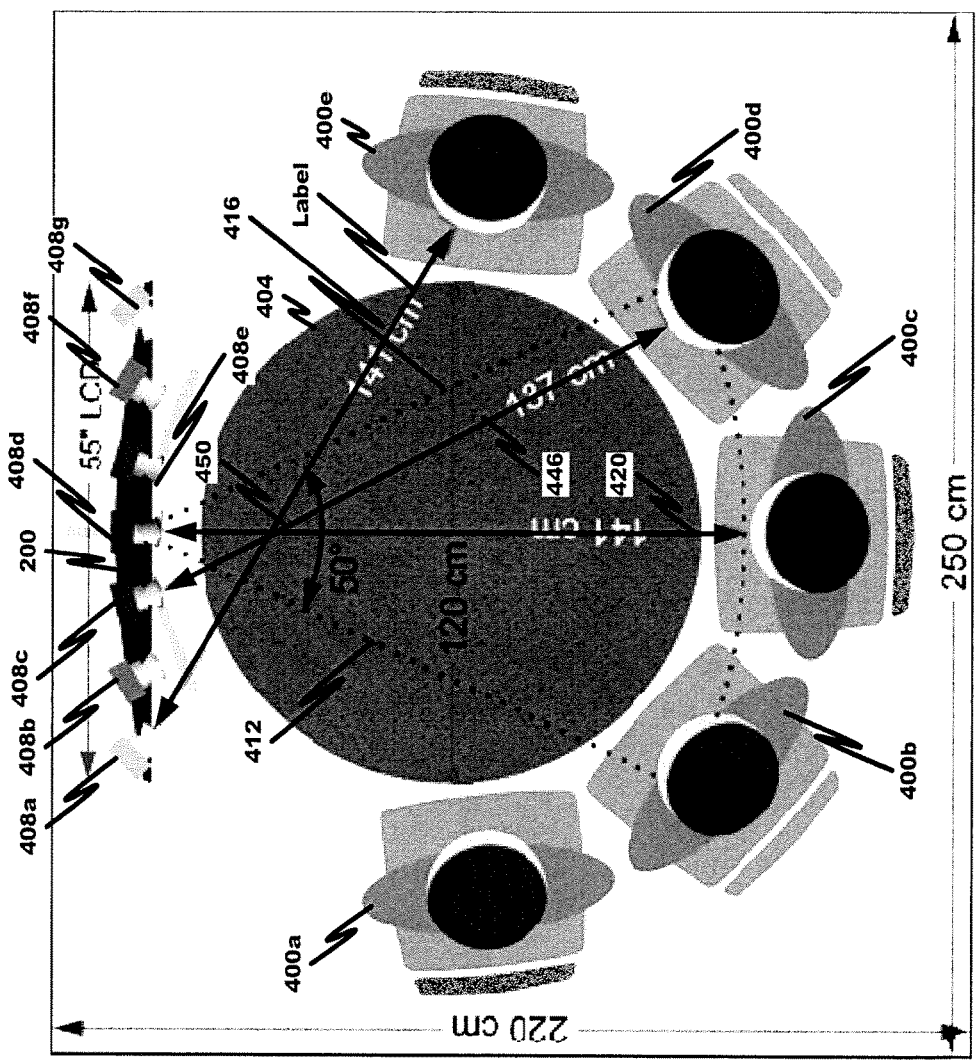
FIG. 4 depicts a first example of a video conferencing system according to an embodiment of the disclosure.

A further example of a video conferencing communication session will be discussed with reference to FIG. 4. The meeting room includes first, second, third, fourth, and fifth participants 400a-e and a conference table 404. The image capturing device 216 (shown as a camera) moves laterally back and forth along a defined continuous track on the upper surface of the display device 200. The image capturing device 216 is shown in various positions 408a-g, each with a different set of pan, tilt, and/or zoom parameters depending on the distance of the aperture of the image capturing device 216 to the participant of interest. At position 408d, the horizontal field of view of the image capturing device 216 is shown by divergent lines 412 and 416, with the optical axis 420 of the image capturing device 216 roughly resting on the third participant 400c. As can be seen, the first and fifth participants 400a and 400e are outside the field of view and therefore hidden or not viewable by remote participants. When the active speaker is the first participant 400a, the image capturing device 216 is moved to position 408g with suitable pan, tilt, and zoom adjustments to cause the optical axis of the image capturing device 216 to rest on the first participant; when the active speaker is the second participant 400b, the image capturing device 216 is moved either to positions 408e or 408f, depending on the desired view, with suitable pan, tilt, and zoom adjustments to cause the optical axis of the image capturing device 216 to rest on or near the second participant 400b; when the active speaker is the third participant 400c, the image capturing device 216 is moved to position 408d with suitable pan, tilt, and zoom adjustments to cause the optical axis of the image capturing device 216 to rest on the third participant; when the active speaker is the fourth participant 400d, the image capturing device 216 is moved either to positions 408b or 408c, depending on the desired view, with suitable pan, tilt, and zoom adjustments to cause the optical axis of the image capturing device 216 to rest on or near the fourth participant 400d (as shown by the optical axis line 446); and when the active speaker is the fifth participant 400e, the image capturing device 216 is moved to position 408a with suitable pan, tilt, and zoom adjustments to cause the optical axis of the image capturing device 216 to rest on the fifth participant 400e (as shown by the optical axis line 450). As can be seen, the lateral and pan movements of the image capturing device 216 are normally in opposing directions.

A further example of a video conferencing communication session will be discussed with reference to FIG. 5A. First and second endpoints 108a and 108b are shown in dislocated first and second meeting rooms 500a and 500b. The first and second endpoints 108a (in the first meeting room 500a) and 108b (in the second meeting room 550b) are in communication with each other via a communication pathway 504 over the network 112. In the first meeting room 500a, first, second, third, fourth, fifth, and sixth participants 508a-f are seated around a table 512, and, in the second meeting room 500b, a seventh participant 508g is seated at a table 516. In a tele-interviewing example, the first, second, third, fourth, fifth, and sixth participants 508a-f are interviewing the seventh participant 508g. An image capturing device 216a in the first room 500a movably engages a first guide track 520a mounted on an upper surface of a first display device 200a, and an image capturing device 216b in the second room 500b movably engages a second guide track 520b mounted on an upper surface of a second display device 200b. In the first room 500a, the image capturing device 216a is in a first position on the first guide track 520a to cause its optical axis 524a to contact the fifth participant 508e (the current active speaker) while, in the second room 500b, the image capturing device 216b is in a second position on the second guide track 520b to cause its optical axis 524b to contact the seventh participant 508g. The first endpoint 108a provides, over the communication pathway 504, the image centered on the fifth participant 508e to the second endpoint 108b for display to the seventh participant 508g, and the second endpoint 108b provides, over the communication pathway 504, the image centered on the seventh participant 508g to the first endpoint 108a for display to the first, second, third, fourth, fifth and sixth participants 508a-f.

Figure 5B:
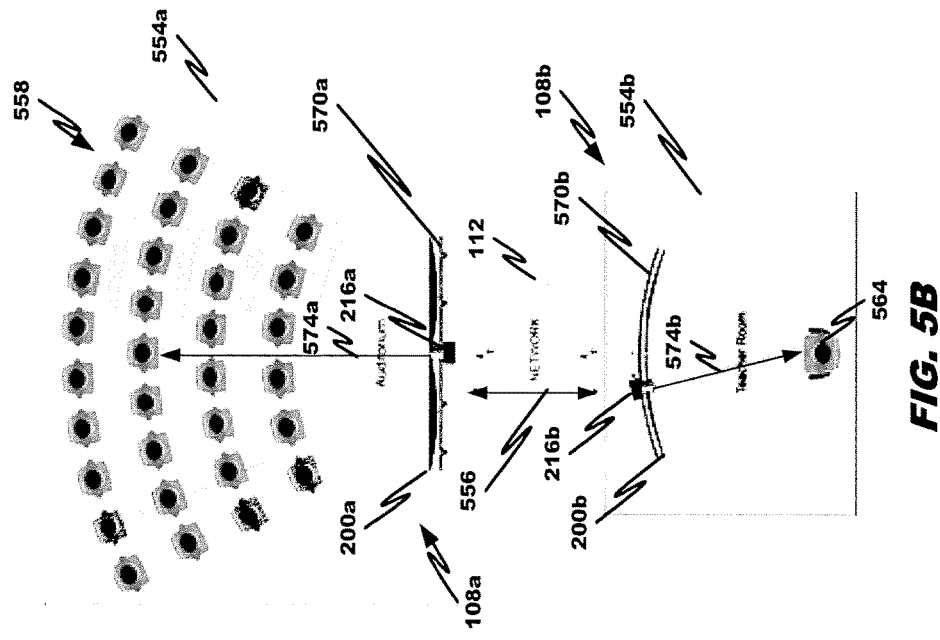
FIGS. 5A and 5B depict second and third examples of video conferencing systems according to an embodiment of the disclosure.

A further example of a video conferencing communication session will be discussed with reference to FIG. 5B. Unlike the business tele-interviewing session of FIG. 5A, FIG. 5B is directed to a tele-teaching session. First and second endpoints 108a and 108b are shown in dislocated first and second meeting rooms 554a and 554b. The first and second endpoints 108a (in the first meeting room 550a) and 108b (in the second meeting room 550b) are in communication with each other via a communication pathway 556 over the network 112. In the first meeting room 554a, plural student participants 558 are seated in an auditorium, and, in the second meeting room 554b, a teaching participant 564 is seated at a table 566. An image capturing device 216a in the first room 554a movably engages a first guide track 570a mounted on an upper surface of a first display device 200a, and an image capturing device 216b in the second room 554b movably engages a second guide track 570b mounted on an upper surface of a second display device 200b. In the first room 554a, the image capturing device 216a is in a first position on the first guide track 570a to cause its optical axis 574a to provide a horizontal field of view to capture all of the student participants while, in the second room 554b, the image capturing device 216b is in a second position on the second guide track 570b to cause its optical axis 574b to contact the teaching participant 564. The first endpoint 108a provides, over the communication pathway 556, the image of the student participants to the second endpoint 108b for display to the teaching participant 564, and the second endpoint 108b provides, over the communication pathway 556, the image centered on the teaching participant 564 to the first endpoint 108a for display to the student participants 558.

Figure 5A:
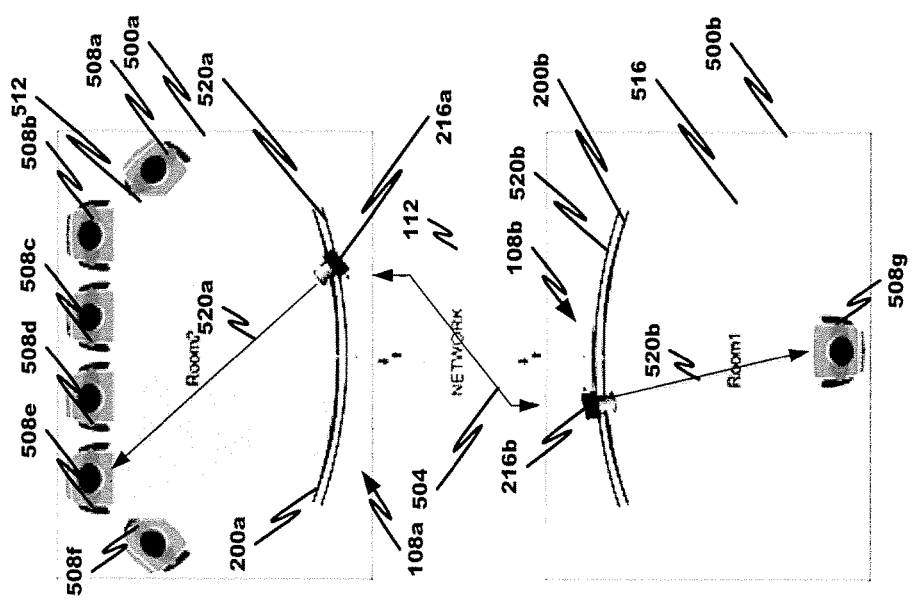

In either example in FIGS. 5A-B, the audio controller 258 in the first endpoint 108a in the first room 500a or 554a can beneficially control, via the second endpoint 108b, the pan and/or tilt and/or spatial position in the second room 500b or 554b of the remote image capturing device 216b of the second endpoint 108b to provide better eye contact between local and remote participant active speakers. Based on the position of the active speaker in the first room 500a or 554a relative to the image capturing device 216a location and/or orientation (and relative orientation of the optical axis of the local image capturing device 216a to the active speaker), the audio controller in the first endpoint 108a can control the position and/or orientation of the image capturing device 216b in the second room 500b or 554b relative to the active speaker seating position in the second room to produce a similarly oriented view of the faces of the local and remote active speakers. A common endpoint, namely the first endpoint 108a, can align the local and remote image capturing devices 216a and 216b to provide opposing images of the active speaker participant in the first room 500a or 554a and participant in the second room 500b or 554b by the display devices 200b and 200a, respectively. Additionally, the local audio controller 258 in the first endpoint 108a can control the playback, via the second endpoint 108b, of the audio information collected by the audio capturing device in the first room 500a or 554a while the remote audio controller 258 in the second endpoint 108b can control the playback, via the first endpoint 108a, of the audio information collected by the audio capturing device in the second room 500b or 554b. This can assist provision of opposing face-to-face views of the local and remote participants by reproducing in the second room 500b or 554b speech of the active speaker participant heard, stereophonically, by the other local participants in the first room 554a; that is, stereophonic reproduction in the second room 500b or 554b of the sound heard in the first room 500a or 554a can cause the teacher participant to turn his or her heard towards a source of the sound, or towards the remote image capturing device 216b.

By way of illustration, if the active speaker in the first room 500a were the sixth participant 508f to the left of the first endpoint 108a, the audio controller in the first endpoint 108a, using sound localization in the first room 500a, would cause the image capturing device 216b in the second room 500b to move to the left of the seventh participant 508g, while the captured audio stream of the sixth participant's statements is played stereophonically through the speakers 202 in the second room 500b by the audio controller in the second endpoint 108b, to give the first, second, third, fourth, fifth and sixth participants 508a-f the view of the seventh participant 508g that they would see if all of the participants were in a common room. The stereophonically reproduced sound in the second room 500b would provide the audible impression to the seventh participant 508g that he or she is seated in a common room with the sixth participant 508f, which can cause the seventh participant to turn his or her head to the left or perceived location of the speaker. The image capturing device 216b can be moved along the guide track 520b while maintaining the pan and tilt of the image capturing device 216b aligned and focused on the seventh participant 508g due to prior location of the seventh participant 508g using manual input, sound localization, image processing, or other technique performed by the second endpoint 108b. Such location of the seventh participant 508g by the second endpoint 108b can be done automatically and periodically during the video conferencing session to maintain alignment and focus of the image capturing device 216b on the seventh participant 508g during track movement.

In other examples, the local audio controller 258 in the first endpoint 108a can beneficially control, via the second endpoint 108b, the pan and/or tilt and/or spatial position in the second room 554b of the remote image capturing device 216b of the second endpoint 108b while the remote audio controller 258 in the second endpoint 108b can beneficially control, via the first endpoint 108a, the pan and/or tilt and/or spatial position in the first room 554a of the local image capturing device 216a of the first endpoint 108a to provide better eye contact between local and remote participant active speakers. Additionally, the local audio controller 258 in the first endpoint 108a can control the playback, via the second endpoint 108b, of the audio information collected by the audio capturing device in the first room 554a while the remote audio controller 258 in the second endpoint 108b can control the playback, via the first endpoint 108a, of the audio information collected by the audio capturing device in the second room 554b. This can maintain constant face-to-face contact, via the local and remote display devices 200a and 200b, of the selected participants.

As will be appreciated, a conventional video conferencing system controls the local pan and tilt of the camera by local audio tracking. This can cause the camera head to shake undesirably based on locally tracked active speaker location. Using audio tracking in a first meeting location to control a camera pan and/or tilt and/or spatial position in a second meeting location, optionally coupled with stereophonic sound playback, can overcome this problem.

Figure 6:
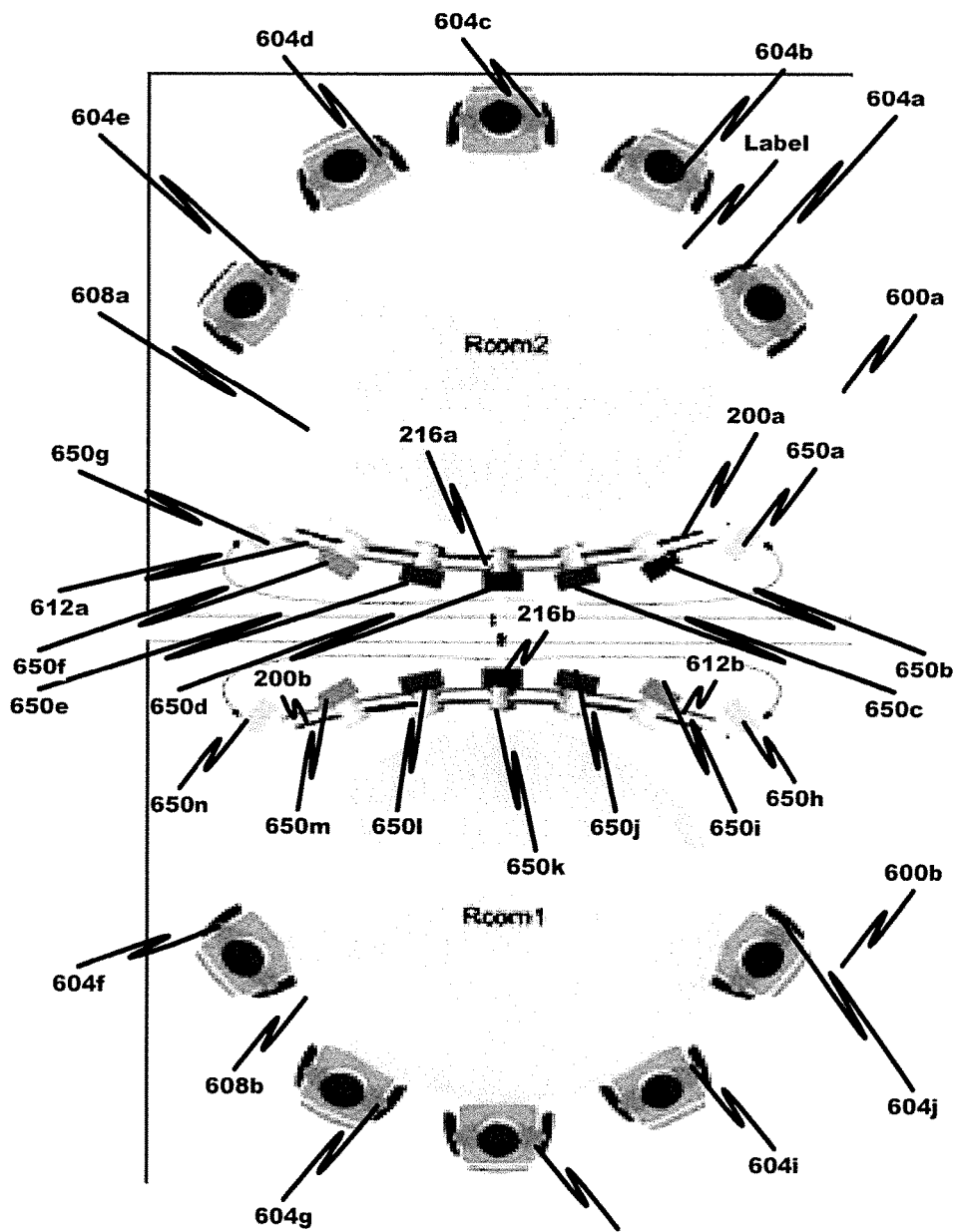
FIG. 6 depicts a fourth example of a video conferencing system according to an embodiment of the disclosure.

A further example of a video conferencing communication session will be discussed with reference to FIG. 6. First and second endpoints 108a and 108b are shown in dislocated first and second meeting rooms 600a and 600b. The first and second endpoints 108a and 108b are in communication with each other via a communication pathway (not shown) over the network 112. In the first meeting room 600a, first, second, third, fourth and fifth meeting participants 604a-e are seated around a table 608a and, in the second meeting room 600b, sixth, seventh, eighth, ninth, and tenth meeting participants 604f-j are seated at a table 608b. An image capturing device 216a in the first room 600a movably engages a first guide track 612a mounted on an upper surface of a first display device 200a, and an image capturing device 216b in the second room 600b movably engages a second guide track 612b mounted on an upper surface of a second display device 200b. In the first room 600a, the image capturing device 216a is in a first position on the first guide track 570a to cause its optical axis (not shown) to provide a horizontal field of view capturing the second, third, and fourth meeting participants (but not the first and fifth meeting participants) while, in the second room 600b, the image capturing device 216b is in a second position on the second guide track 612b to cause its optical axis (not shown) to provide a horizontal field of view capturing the seventh, eighth, and ninth meeting participants (but not the sixth and tenth meeting participants). The first endpoint 108a provides, over the communication pathway, the image of the meeting participants in the first room 600a to the second endpoint 108b for display by the display device 200b, and the second endpoint 108b provides, over the communication pathway (not shown), the image of the meeting participants in the second room 600b to the first endpoint 108a for display to by the display device 200a.

When the active speaker, in the first room 600a, is the first participant 604a, the image capturing device 216a is moved to position 650g along the first guide track 612a with suitable pan, tilt, and zoom adjustments to cause the optical axis of the image capturing device 216a to rest on the first participant 604a; when the active speaker is the second participant 604b, the image capturing device 216a is moved either to positions 650e or 650f along the first guide track 612a, depending on the desired view, with suitable pan, tilt, and zoom adjustments to cause the optical axis of the image capturing device 216a to rest on or near the second participant 604b; when the active speaker is the third participant 604c, the image capturing device 216a is moved to position 650d along the first guide track 612a with suitable pan, tilt, and zoom adjustments to cause the optical axis of the image capturing device 216a to rest on the third participant 604c; when the active speaker is the fourth participant 604d, the image capturing device 216a is moved either to positions 650b or 650c along the first guide track 612a, depending on the desired view, with suitable pan, tilt, and zoom adjustments to cause the optical axis of the image capturing device 216a to rest on or near the fourth participant 604d; and when the active speaker is the fifth participant 604e, the image capturing device 216a is moved to position 650a along the first guide track 612a with suitable pan, tilt, and zoom adjustments to cause the optical axis of the image capturing device 216a to rest on the fifth participant 604e. A similar image capturing device 216b is used for the sixth, seventh, eighth, ninth, and tenth participants 604f-j with respect to positions 650h-n along the second guide track 612b.

In this example, the local audio controller 258 in the first endpoint 108a can control the pan and/or tilt and/or spatial position in the first room 554a of the local image capturing device 216a of the first endpoint 108a and the remote audio controller 258 in the second endpoint 108b can control the pan and/or tilt and/or spatial position in the second room 554b of the remote image capturing device 216b of the second endpoint 108b to provide better eye contact between local and remote participant active speakers. Additionally, the local audio controller 258 in the first endpoint 108a can control the playback, via the second endpoint 108b, of the audio information collected by the audio capturing device in the first room 600a while the remote audio controller 258 in the second endpoint 108b can control the playback, via the first endpoint 108a, of the audio information collected by the audio capturing device in the second room 600b.

Multi-Operating Modes

In one configuration, the control unit 212 has multiple operating modes that are selectable by a user and/or automatically selected based on sensed context of the conferencing session. In each operating mode, a different algorithm is employed by the imaging controller 256 and/or audio controller 258. The different algorithms, for instance, can use different sets of input and/or control parameters or different rule sets to control unit operations. The different sets of input and/or control parameters can have different types of parameters and/or different values for a common parameter type. The different rule sets can use different rules for a common set of input and/or control parameters to cause different endpoint behaviors, such as different camera movements (e.g., movement along the track, pan, tilt, or zoom), different displayed layouts of images captured by other endpoints, and/or different audio playback effects.

By way of first illustration, a first operating mode can enable dual control of an image capturing device by local and remote endpoints 108a and b; a second operating mode can enable control of a first image capturing device 216a by a dislocated second endpoint 108b; and a third operating mode can enable control of each of the first and second image capturing devices 216a and b only by the first and second endpoints 108a and b, respectively.

By way of second illustration, a first operating mode can provide stereophonic sound playback by an endpoint while a second operating mode can provide monophonic sound playback by the endpoint.

By way of third illustration, a first operating mode can use a first display layout for presenting images captured by remote endpoint(s); a second operating mode can use a different second display layout for presenting images captured by remote endpoint(s); and a third operating mode can use a still different third display layout for presenting images captured by remote endpoint(s). The first layout, for example, can ignore active speaker identity or sound localization by the remote endpoint and simply provide a constant captured view of a selected area in the remote room. The second layout, for example, can use active speaker identity or sound localization by the remote endpoint and provide a periodically updated focused and centered view of the current remote active speaker. The third layout, for example, can use active speaker identity or sound localization by the remote endpoint and provide not only a constant captured view of the selected area in the remote room in a first frame but also a periodically updated focused and centered view of the current remote active speaker in the remote room in a second frame. Other layout options can have additional frames to capture a whiteboard or other selected object.

The sensed context of the conferencing session can vary upon a number of factors. These factors include a number of participants at each endpoint location, a number of endpoint locations participating in the conferencing session, a purpose of the conferencing session (e.g., tele-teaching, tele-interviewing or business conference), video conferencing preferences of one or more of the participants, and the like. The factors can be identified by user input, image processing of captured images to identify number of participants and/or analyze biometric information to identify participants, textual analysis of related emails and invitation requests (e.g., key word or phrase identification), contact information (e.g., electronic addresses) of the various endpoints involved, any other analytical technique noted above in connection with the imaging and audio controller, and the like.

Guide Track Assembly Configurations

Various guide track assembly configurations will now be described with reference to FIGS. 7A-7E.

Figure 7A:
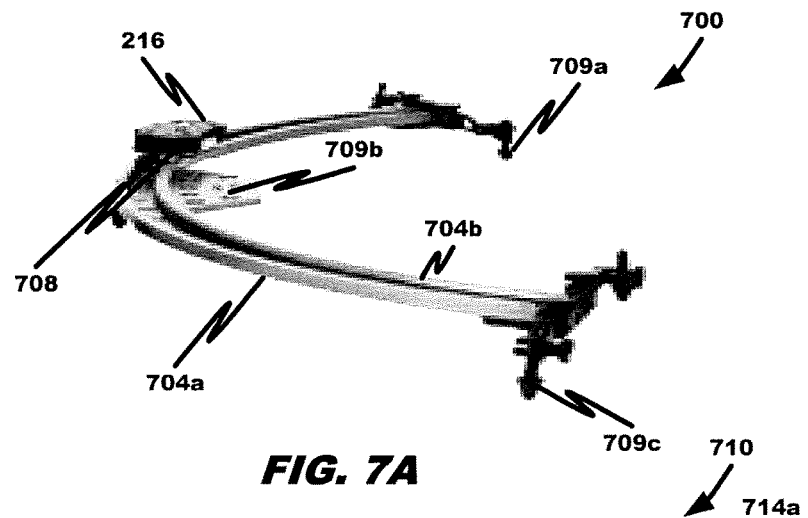
FIGS. 7A-7E depict various guide track assembly configurations according to embodiments of the disclosure.
Figure 7B:
Figure 7C:
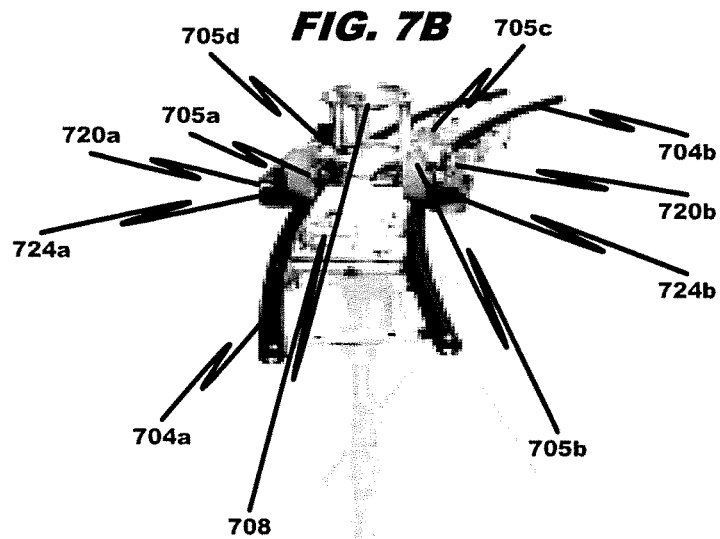

With reference to FIGS. 7A and 7C, a first guide track assembly configuration 700 comprises curved or arcuate first and second spaced apart tracks 704a,b contacting a carriage 708 supporting the image capturing device 216. The carriage includes four wheels 705a-d movably engaging the first and second tracks 704a,b to enable bidirectional carriage movement along the first and second tracks. The first guide track assembly 700 is mounted on top of the display device 200 by brackets 709a-c. To maintain the carriage 708 on the first and second tracks 704a,b, the carriage 708 engages first and second side brackets, each of the side brackets 720a,b including a pair of stabilizing wheels 724a,b.

With reference to FIG. 7B, a second guide track assembly configuration 710 also comprises curved or arcuate first and second spaced apart tracks 714a,b contacting a carriage 718 supporting the image capturing device 216. The tracks are embedded in and hidden by an upper surface of the display device 200.

Figure 7D:
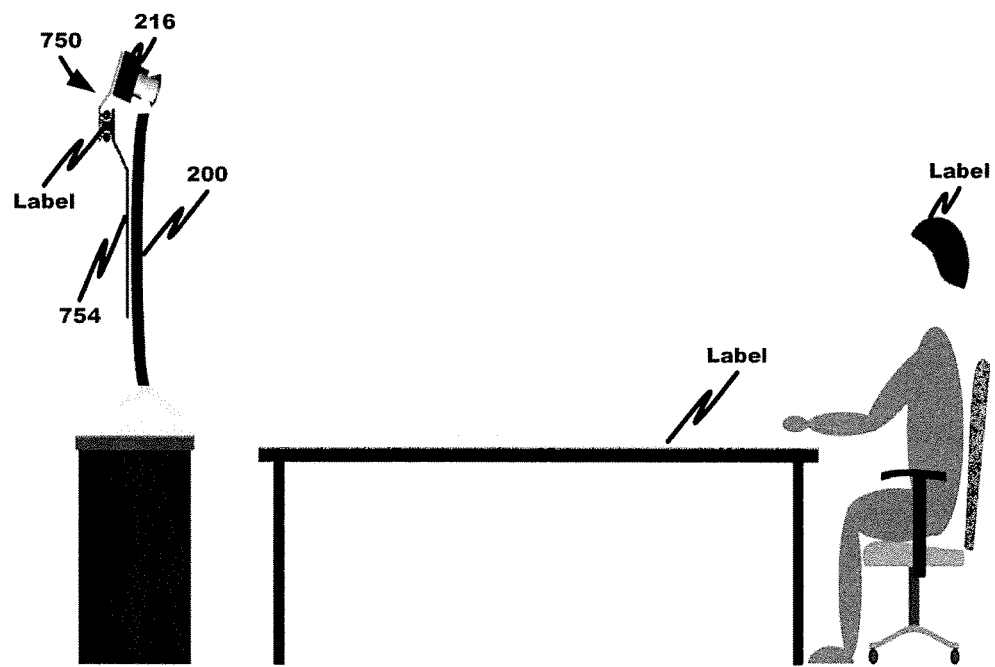
Figure 7E:
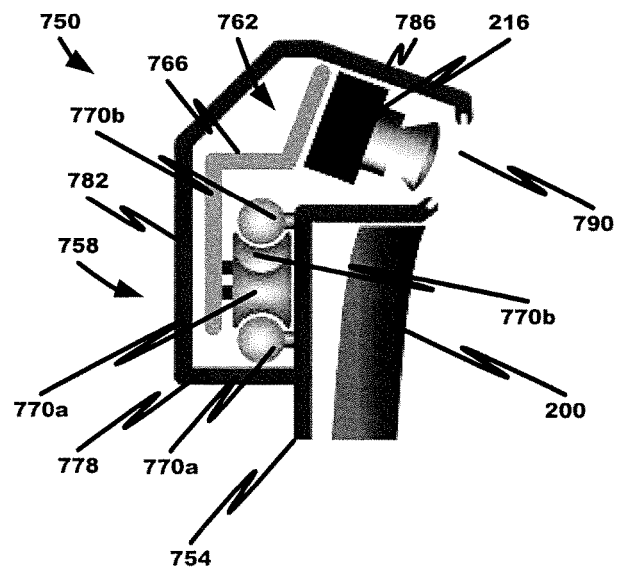

With reference to FIGS. 7D-E, a third guide track assembly configuration 750 is depicted. The third guide track assembly configuration 750 comprises a support arm 754 attached to a rear surface of the display device 200, an upper housing 758 attached thereto, and a guide track assembly 762 comprising a carriage 766 for the image capturing device 216 moveably engaging first and second spaced apart guide tracks or tracks 770a,b. The carriage 766 engages the first and second spaced apart guide tracks 770a,b by first and second rollers 774a,b to enable bidirectional carriage movement along the first and second guide tracks. The upper housing 758 includes bottom, rear and upper surfaces 778, 782, and 786 and a transparent cover member 790, typically made of glass or plexiglass through which the lens of the image capturing device 216 can capture images of one or more participants in the meeting room while hiding movement of the image capture device 216.

While guide track assembly configurations with two tracks have been discussed, it is to be appreciated that any number of tracks may be employed. For instance, a monorail or tri-rail track configuration can be employed depending on the application.

Figure 8:
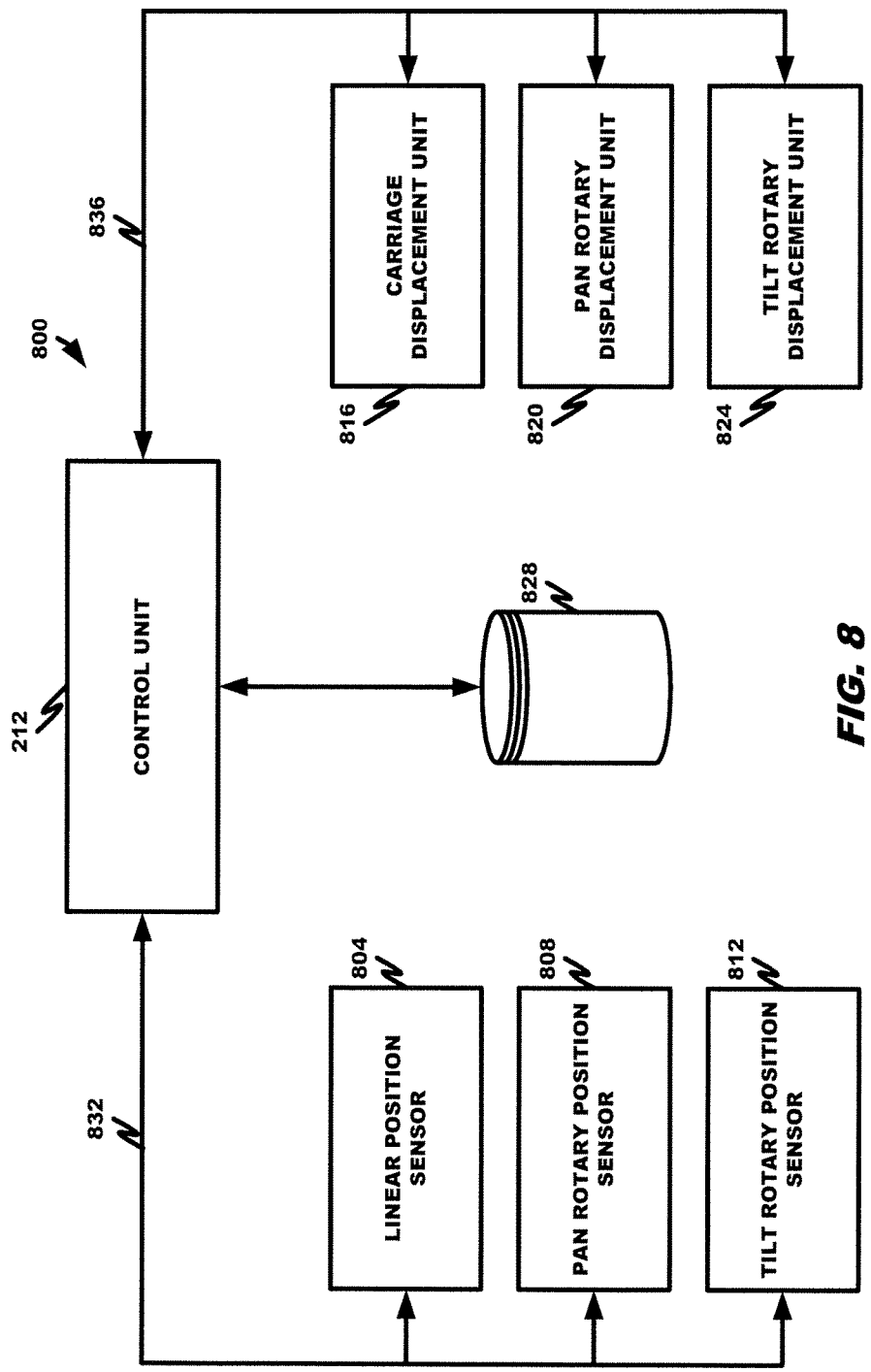
FIG. 8 is a block diagram of a guide track assembly control system according to an embodiment.

FIG. 8 is a block diagram of a guide track assembly control system according to an embodiment of the disclosure. The control system 800 comprises the control unit 212, linear, pan rotary, and tilt rotary position sensor 804, 808, and 812, carriage displacement unit 816, pan and tilt rotary displacement units 820 and 824, and database 828, all in communication with one another via control lines 832 and 836.

The positions of the image capturing device 216 along the guide tracks or in the horizontal and vertical planes relative to a point of reference can be determined by a suitable displacement measuring system that uses a position and/or displacement sensor to produce an output signal representing, as appropriate, a distance the carriage has traveled from the reference point, a displacement measurement indicating a direction of motion, and/or a degree of rotation in the selected horizontal or vertical plane of the image capturing device 216 relative to a reference point. Exemplary position or displacement sensors include an optical position sensor, such as a laser triangulation position or LED sensor, a fiber optic position sensor, capacitive position sensor, an inductive position sensor such as a linear variable differential transformer, magneto-inductive displacement, or inductive proximity sensor, a linear potentiometer or other type of resistive position sensor, a magnetostrictive linear position sensor, Hall Effect-based magnetic position sensor, a mechanical position sensor such as a draw wire position sensor, a rotary encoder such as an incremental or absolute position encoder or 4-bit binary coded disc, or other type of contact sensor, an ultrasonic position sensor, an eddy current sensor, and other contact and non-contact displacement or position sensors appreciated by those of skill in the art.

The carriage displacement unit 816, pan rotary displacement unit 820, and tilt rotary displacement unit 824 can be any suitable device to displace the carriage laterally and linearly along the guide tracks, rotate the image capturing device 216 in the horizontal plane, or rotate the image capturing device 216 in the vertical plane, respectively. Examples of suitable devices include without limitation a motor, a continuous belt, a series of intermeshed toothed gears, or other electromechanical displacement system, an electromagnetic displacement system comprising a magnetic material and one or more coils, a magnetic displacement system comprising magnetic materials on the carriage and a moving magnetic in proximity thereto, electric displacement system comprising one or more conductors on the carriage and or in proximity thereto, and the like. The carriage displacement unit, pan rotary displacement unit, and tilt rotary displacement unit can be located within or external to the display device 200 or image capturing device 216, as appropriate.

The database 828 can be any type of database, including without limitation a navigational, relational, standardized query language ("SQL"), object-oriented, No SQL or NewSQL database schema. The database 828 typically includes look up tables mapping speaker localization input from the audio capturing device 220 to active participant speaker location and active participant speaker location against desired positional, pan, tilt, and zoom parameters for the image capturing device 216.

The control unit 212 receives input from the audio capturing device 216, determines the current active participant speaker location, and, when appropriate, provides positional and orientational commands to the carriage, pan rotary, and tilt rotary displacement units 816, 820, and 824 to position and orient the image capturing device 216 to capture the image of the active participant speaker.

Control Unit Methods of Operations

Figure 9:
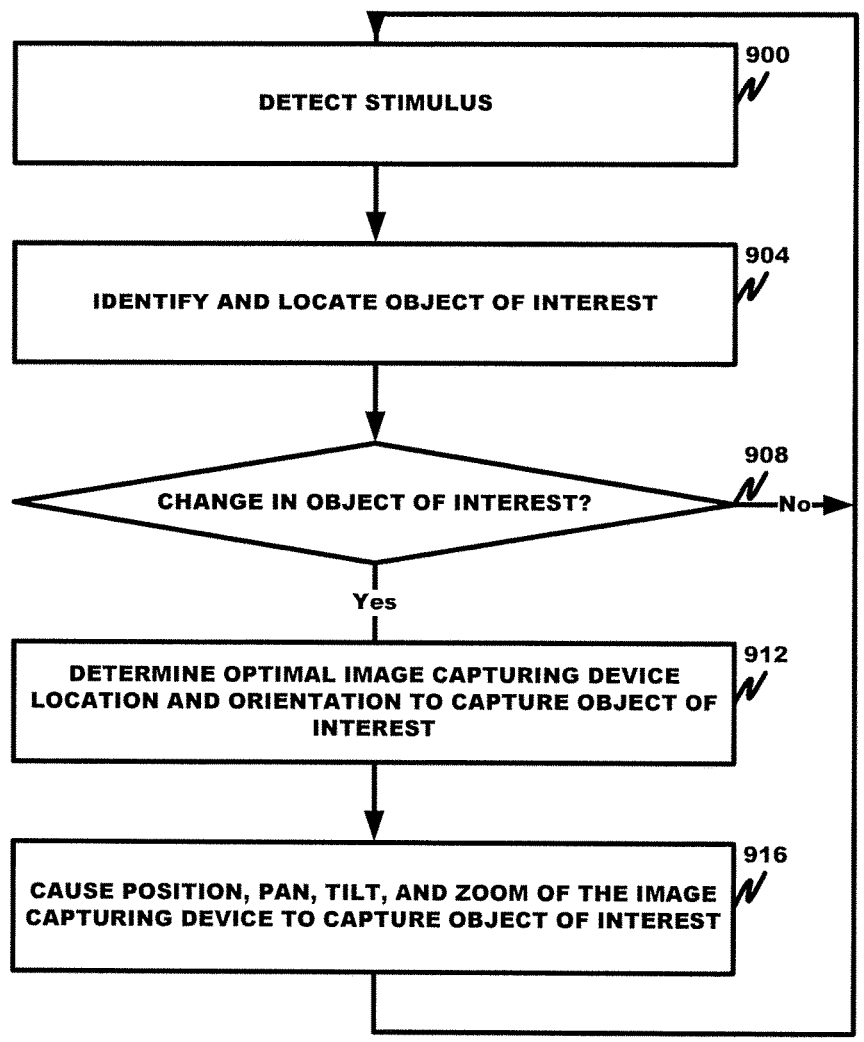
FIG. 9 is a flow chart depicting image processing logic according to the embodiment.

The operation of the control unit 212 will now be discussed with reference to FIG. 9.

In step 900, the controller 204, executing the imaging controller, detects a stimulus, such as passage of a selected period of time, remote or local participant command, and the like.

In response, the controller 204, in step 904, identifies and locates objects of interest in the local monitored communication session area or room. All objects of interest (e.g., participants) can first be identified and/or spatially located, for example, by acquiring the facial images of each participant in a captured image using face detection techniques, motion detection, active speaker tracking using speaker localization and a microphone array, gaze detection of one or more participants, and the like. The imaging controller 256, using face detection techniques, microphone array analysis, or motion detection, can detect a participant entering or leaving the monitored communication session area. Once identified and/or located, suitable image capturing device 216 positional and orientational parameters can be associated with each participant location, or pre-selected, for later use as each participant becomes the active speaker during the communication session. Alternatively, the selection of the parameters can be done automatically when a participant is determined to be the (new) active speaker.

In any event, the processor 236 determines, in decision diamond 908, determines whether or not there has been a change in the object of interest (e.g., active speaker) since a last iteration of the algorithm.

When a change has occurred in the object of interest, the processor 236, in step 912, determines, from the database 828, the optimal image capturing device 216 location and orientation to capture the image of the new object of interest.

In step, 916, the processor 236 causes the position, pan, tilt, and zoom of the image capturing device 216 to be adjusted to capture the image of the new object of interest.

When a change has not occurred in the object of interest or after step 916, the processor 236 returns to and repeats step 900.

Figure 11:
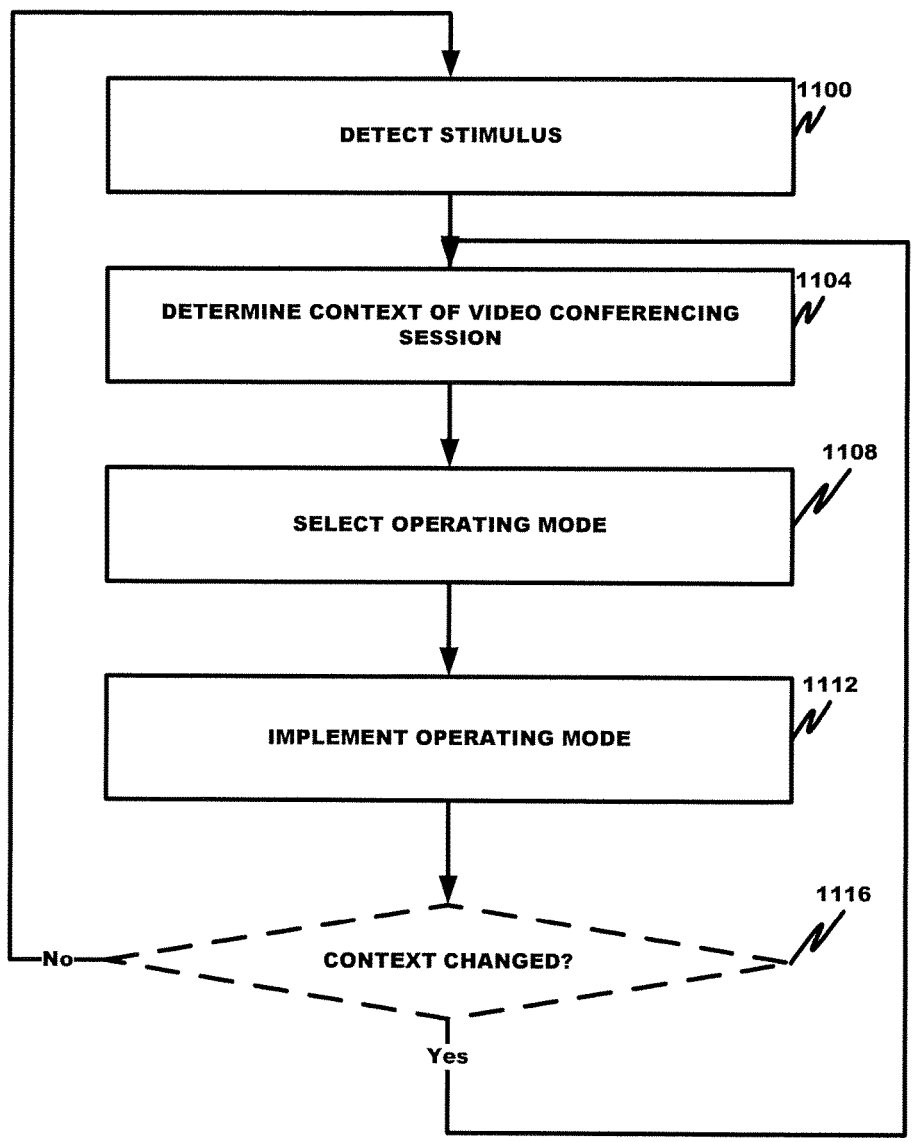
FIG. 11 is a flow chart depicting multi-operating mode logic according to the embodiment.

A method of operation of the control unit 212 will now be discussed with reference to FIG. 11.

In step 1100, the control unit 212 detects a stimulus, such as passage of a selected period of time, remote or local participant command, and the like.

In step 1104, the control unit 212 determines a context of the video conferencing session.

In step 1108, the control unit 212 selects an operating mode, from among multiple possible operating modes, based on the determined context of the video conferencing session.

In step 1112, the control unit 212 implements the selected operating mode. This can include reconfiguring the settings, operations, and/or functions of one or more endpoints 108 that are participating or will participate in the video conferencing session.

In optional query 1116, the control unit 212 determines a current context and whether the current context is different from a context determined in step 1104. If the context has not changed, the control unit 212 returns to step 1100 as shown or periodically repeats query 1116 until a change in the context is detected. If the context has changed, the control unit 212 returns to step 1104. Optional query 1116 enables the control unit to detect and respond automatically to changes in context during the session. Changes include, for instance, a new participant appearing an endpoint location, an endpoint joining the session, a change in point of focus of the participants at one or more endpoint locations, and the like.

Any of the steps, functions, and operations discussed herein can be performed continuously and automatically.

The exemplary systems and methods of this disclosure have been described in relation to a distributed video conferencing system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A video-enabled communication system, comprising:
a microprocessor, coupled with camera, to receive an image of an object of interest during a video communication session; and
a computer readable medium comprising instructions that program the microprocessor: (a) in a first operating mode, use a first set of instructions to perform a first video communication operation or function and (b) in a second operating mode, use a different set of instructions to perform the first video communication operation or function; and
an imaging controller that causes the microprocessor to move the camera from a first spatial location to a second spatial location relative to a selected point of reference to enable the camera to capture different images of a local participant for display, by a remote display device, to a remote participant to the video communication session; and
wherein the camera is a pan, tilt, and zoom camera, wherein, as a result of the movement, the pan rotational axis moves from the first spatial location to the second spatial location, and wherein the camera movement moves the camera linearly or curvilinearly from the first to the second spatial locations; and
a guide track assembly comprising at least one track along which the camera moves via a carriage movably engaging the at least one track, wherein the guide track assembly comprises:
a carriage displacement unit to cause camera movement along the at least one track; and
a displacement measuring system to determine a position and/or displacement of the camera, relative to the selected point of reference, along the at least one track, wherein the microprocessor determines the second spatial location of the camera based on a sensed location of the local participant, wherein the guide track assembly further comprises a support arm engaging a local display device and a housing, engaging the support arm, and enclosing, at least partially, the at least one track, carriage, and camera, and wherein the housing comprises a substantially transparent front surface to enable the camera to capture images of the local participant.

2. The system of claim 1, wherein the first video communication operation or function is one or more of collect local video or audio information during the video communication session, process the collected local video or audio information for output to a remote endpoint, or display remote video or audio information received from the remote endpoint.

3. The system of claim 1, wherein, in the first operating mode, the camera at a first location is controlled by the microprocessor and, in the second operating mode, the camera at the first location is controlled at least partially by a different microprocessor at a remote endpoint.

4. The system of claim 1, wherein the microprocessor, in the first operating mode, causes a set of speakers at a first location to provide stereophonic sound playback of audio information captured during the video communication session by a remote endpoint and, in the second operating mode, causes the set of speakers at the first location to provide monophonic sound playback of the audio information captured during the video communication session by the remote endpoint.

5. The system of claim 1, wherein the microprocessor provides a display to a participant at a first location and wherein, in the first operating mode, the display has a first layout, the first layout comprising one or more images captured, during the video communication session, by a camera at a remote endpoint and, in the second operating mode, the display has a second layout, the second layout comprising one or more images captured, during the video communication session, by the camera at the remote endpoint, wherein the first and second layout differ by having different numbers or different types of displayed images.

6. The system of claim 1, wherein the microprocessor selects the first or second operating modes based on a sensed context of the video communication session, wherein the sensed context is defined by one or more of a number of session participants at each endpoint location, a number of endpoint locations participating in the session, a purpose of the session, and video conferencing preferences of one or more of participants to the session.

7. The video-enabled communication system of claim 1, further comprising a microphone.

8. The video-enabled communication system of claim 7, wherein the microphone comprises a microphone array.

9. The video-enabled communication system of claim 1, further comprising a microphone providing the location of the sensed participant.

10. The video-enabled communication system of claim 1, wherein the microphone monitors participants within a monitored communication session.

11. A video-enabled communication system, comprising:
a control unit, coupled with a camera, the camera acquiring an image of a local participant to provide to a remote participant during a video communication session, wherein the control unit comprises:
a microprocessor; and
a computer readable medium comprising an audio controller that causes the microprocessor to control, based on audio information collected by the control unit, movement and/or pan and/or tilt of a camera at a remote endpoint of the remote participant to capture a selected image of the remote participant for display to the local participant; and
wherein the computer readable medium comprises an imaging controller that causes the microprocessor to move the camera from a first spatial location to a second spatial location relative to a selected point of reference to enable the camera to capture different images of the local participant for display, by a remote display device, to the remote participant to the video communication session; and
wherein the camera is a pan, tilt, and zoom camera, wherein, as a result of the movement, the pan rotational axis moves from the first spatial location to the second spatial location, and wherein the camera movement moves the camera linearly or curvilinearly from the first to the second spatial locations; and
a guide track assembly comprising at least one track along which the camera moves via a carriage movably engaging the at least one track, wherein the guide track assembly comprises:
a carriage displacement unit to cause camera movement along the at least one track; and
a displacement measuring system to determine a position and/or displacement of the camera, relative to the selected point of reference, along the at least one track, wherein the microprocessor determines the second spatial location of the camera based on a sensed location of the local participant, wherein the guide track assembly further comprises a support arm engaging a local display device and a housing, engaging the support arm, and enclosing, at least partially, the at least one track, carriage, and camera, and wherein the housing comprises a substantially transparent front surface to enable the camera to capture images of the local participant.

12. The system of claim 11, wherein the microprocessor's control of the movement and/or pan and/or tilt of the camera at the remote location is based on sound localization by the microprocessor at a location comprising the local participant.

13. The system of claim 11, further comprising:
an audio capturing device to capture speech of the local participant, wherein
the audio controller provides the captured speech to first and second sound speakers at the remote location for stereophonic playback of the speech by the first and second sound speakers, to the remote participant, the stereophonic playback being based on the sensed location of the local participant relative to the selected point of reference.

14. The system of claim 11, wherein the computer readable medium comprises instructions that program the microprocessor: (a) in a first operating mode, use a first set of instructions to perform a first video communication operation or function and (b) in a second operating mode, use a different set of instructions to perform the first video communication operation or function.

15. The system of claim 14, wherein the first video communication operation or function is one or more of collect local video or audio information during the video communication session, process the collected local video or audio information for output to a remote endpoint, or display remote video or audio information received from the remote endpoint.

16. A method, comprising:
determining, by a microprocessor at a first endpoint to a video communication session, a location of an active speaker in proximity to the first endpoint; and
controlling, by the microprocessor and based on the determined location of the active speaker, movement and/or pan and/or tilt of a camera at a remote location to the video communication session to capture a selected image of a remote participant for display at the first endpoint;

wherein the camera is a pan, tilt, and zoom camera and wherein, as a result of the movement, moving, by the microprocessor, the pan rotational axis from the first spatial location to the second spatial location, and moving, by the microprocessor, the camera linearly or curvilinearly from the first to the second spatial locations;

wherein camera movement is via a guide track assembly comprising at least one track along which the camera moves via a carriage movably engaging the at least one track; and wherein the guide track assembly comprises a carriage displacement unit to cause camera movement along the at least one track, a displacement measuring system to determine a position and/or displacement of the camera, relative to the selected point of reference, along the at least one track, wherein the microprocessor determines the second spatial location of the camera based on a sensed location of the local participant, wherein the guide track assembly further comprises a support arm engaging a local display device and a housing, engaging the support arm, and enclosing, at least partially, the at least one track, carriage, and camera, and wherein the housing comprises a substantially transparent front surface to enable the camera to capture images of the local participant.

17. The method of claim 16, wherein the microprocessor's control of the movement and/or pan and/or tilt of the camera at the remote location is based on sound localization by the microprocessor at a location comprising the local participant.

18. The method of claim 16, wherein the microprocessor moves the camera from a first spatial location to a second spatial location relative to a selected point of reference to enable the camera to capture different images of the local participant for display, by a remote display device, to a remote participant to the video communication session.

19. The method of claim 16, further comprising:
capturing, by an audio capturing device, speech of the local participant; and
providing, by the audio controller, the captured speech to first and second sound speakers at the remote location for stereophonic playback of the speech by the first and second sound speakers to the remote participant, wherein the stereophonic playback is based on the sensed location of the local participant relative to the selected point of reference.

* * * * *